Aug. 19, 1958          E. W. TODD          2,848,278
GAUGE WHEEL FOR AGRICULTURAL IMPLEMENTS
Filed Oct. 15, 1954

INVENTOR:
Everett W. Todd
by James E. Nilles
Attorney

United States Patent Office 2,848,278
Patented Aug. 19, 1958

2,848,278

GAUGE WHEEL FOR AGRICULTURAL IMPLEMENTS

Everett W. Todd, Racine, Wis., assignor to Massey-Ferguson Inc., a corporation of Maryland Application October 15, 1954, Serial No. 462,499

1 Claim. (Cl. 301—63)

This invention relates to a wheel construction and finds particular utility in a gauge wheel for agricultural implements.

Agricultural implements are often carried and supported by the tractive vehicle with which they are associated. It is important, therefor, to keep the weight of these implements at a minimum and insure that they are capable of operating at high speeds.

Accordingly it is an object of this invention to provide a lightweight gauge wheel for agricultural implements which has a high weight-strength ratio and is provided with means for readily mounting a high speed anti-friction bearing.

An object of this invention is to provide a wheel construction which has a minimum number of parts and is easily assembled; the wheel being comprised of complementary disk-shaped halves which are of spokeless construction so as to preclude the accumulation of debris, such as vines and stalks, from becoming entangled in the wheel.

It is a general object of this invention to provide a gauge wheel which is economical to manufacture, easily assembled, and which is efficient in performing the functions for which it was designed.

It is a more specific object of this invention to fabricate a wheel from two complementary halves which form an accurate and positive seating surface for a bearing that rotatably supports the wheel on a shaft.

It is another object of this invention to provide a simple bearing arrangement for a gauge wheel which is quickly assembled within the wheel and which supports the load carried by the wheel in a plane passing through the center of the wheel in an axial direction and normal to the supporting shaft.

Other objects and advantages will appear more fully as this disclosure progresses, reference being had to the accompanying drawings, in which.

Figure 1:
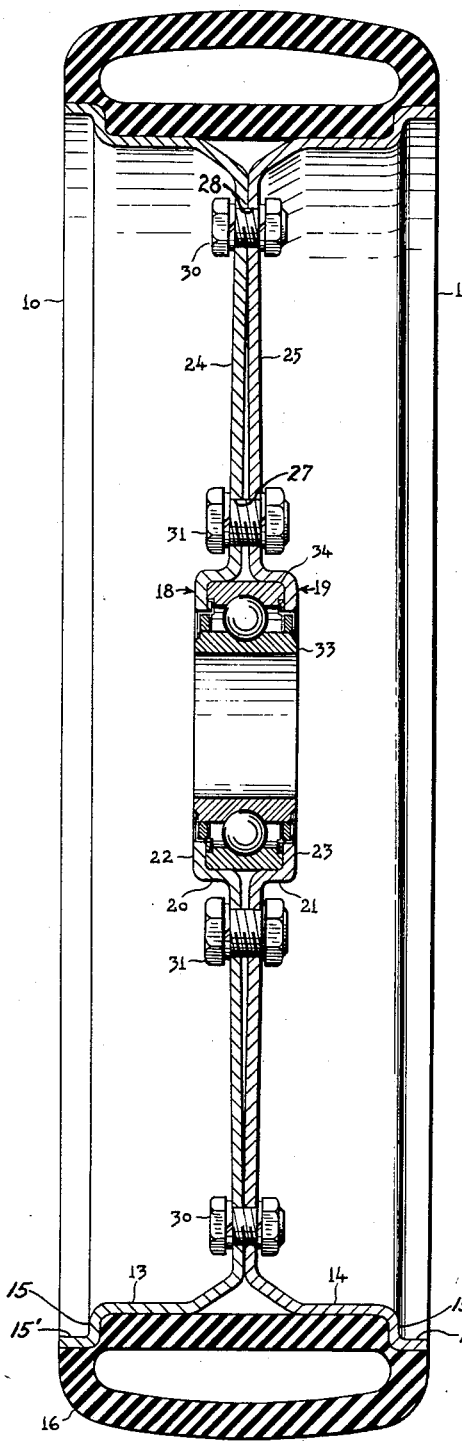
Figure 1 is a sectional view through the gauge wheel.

Referring in greater detail to the drawings, the wheel itself comprises a pair of complementary disk-like halves 10, 11 which are fabricated, usually by stamping, from a single piece of sheet steel. These dish-shaped disks 10, 11 each have at their peripheries an axially extending, tire seat flange 13, 14 respectively. A radially extending tire retaining flange 15 embraces a side portion of the tire 16 and serves to clamp the tire in position as will appear more fully hereinafter. The outer rim portion 15' serves as a support for the outer edge of the tire and with flanges 14 and 15 form a strong and rigid wheel rim and provide a firm support for the flexible tire 16.

The central portion of each of the disks has a large shaft receiving aperture around which is formed a central flange 18, 19 which each comprise an axially extending bearing seat flange 20, 21 and a radially extending bearing clamping flange 22, 23. The intermediate web portions 24, 25 of the disks 10, 11 contain a series of apertures 27, 28 which are circumferentially spaced in concentric circles. The disks are secured together by an outer ring of securing means, such as nuts and bolts 30, and an inner ring of nuts and bolts 31.

The bearing proper comprises a conventional ball bearing assembly which has the usual inner race 33 in which a supporting shaft is inserted, outer race 34 and the ball bearings 35. The ball bearings 35 are sealed against dirt or other foreign matter, by means of the relatively thin metal washers 38, 39 which are crimped together into the annular groove 40 at either side of the outer race 34. A lubricant saturated felt washer 41 is positioned between metal washers 38, 39 and is in sealing contact with race 33. The inner ends 43, 44 of the washers 38, 39 form a running fit with the inner race 33.

Figure 2:
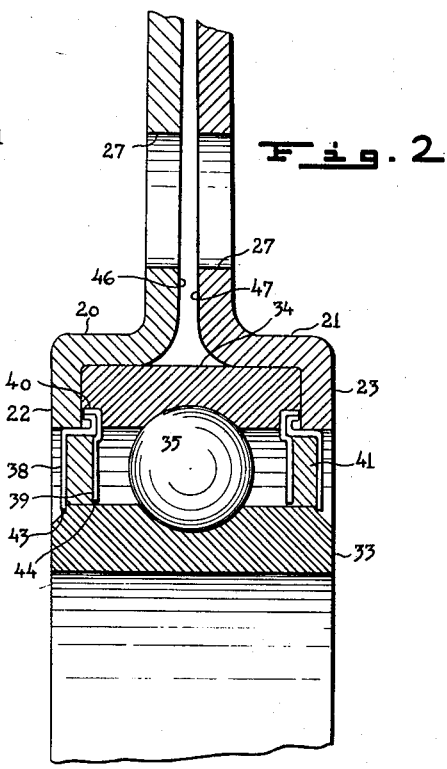
Figure 2 is a fragmentary sectional view, on an enlarged scale, showing the bearing and the portion of the wheel to which it is secured.

As best shown in Figure 2, the flange portions 20, 21, 22, and 23 of the complementary disks 10 and 11 form seating surfaces for the outer race 34 and provide support against both radial and axial thrusts. The bearing seat flanges 20, 21 are of such width in an axial direction so as to preclude contact between the inner surface 46, 47 of the disks 10, 11 until the inner ring of nuts and bolts 31 is drawn taut. In this manner the bearing clamping flanges 22, 23 are drawn snugly against sides of race 34. It is pointed out that the clearance between surfaces 46, 47 should be on the order of only a few thousandths of an inch at the time retaining flanges 22, 23 are brought up against the race 34. By so limiting this clearance, excessive pressure on the sides of the race 34 is prevented which would "bow" the entire bearing assembly. The illustration of Figure 1 shows the assembly just prior to the final tightening of the inner ring of bolts, after which the surfaces 46 and 47 finally touch one another; the web portions 24, 25 yielding enought for this purpose. The need of other fastening means for retaining the pre-assembled bearing unit within the wheel, such as snap rings, bolts, etc., is eliminated.

The smooth lines and clean design of this wheel provide little opportunity for debris to become entangled in, or wound about, any of its parts. This wheel is simple in construction, yet is very rigid and has a high strength-weight ratio. Assembly of the wheel is readily accomplished by positioning one of the disks with its inner side facing upwardly, slipping the tire over the seating flange 14 and snugly against the retaining flange 15, placing the pre-assembled bearing unit within seating flange 21 and against the clamping flange 23, positioning the other disk over the tire and bearing and securing it to the first disk by the nut and bolt means mentioned above. Furthermore, and this is important, a relatively inexpensive ball bearing assembly is provided for a wheel of the above type which is quickly, accurately and positively located and held in the axial center of the wheel. The bearing is aligned in a plane passing through the center of the axial width of the wheel in a normal direction to the shaft, thereby eliminating any twisting moments which are obviously detrimental to bearing life.

What is desired to be secured by Letters Patent is:

A gauge wheel for agricultural implements comprising; a pair of complementary axial spaced disks each having around their periphery an axially extending tire seat flange and a radially extending tire retaining flange; a flexible tire mounted on said seat flange and between said retaining flanges and rigidly held thereby; said disks each having a central flange defining an aperture and comprising, an axially extending bearing seating flange, a radially extending bearing clamping flange; said disks each having a radially inner and outer ring of circumferentially spaced apertures, a bearing assembly comprising inner and outer races, said outer race mounted within said bearing seating flange and between said clamping flanges; and means including bolts extending through said apertures for securing said disks together whereby said tire and said bearing assembly are rigidly held by said retaining flanges and said clamping flanges, respectively; said axially extending bearing seating flanges being of less total length in an axial direction than said outer race before said disks are rigidly secured together.

References Cited in the file of this patent

UNITED STATES PATENTS

| | | |
|---|---|---|
| 1,669,223 | White | May 8, 1928 |
| 2,010,499 | Smith | Aug. 6, 1935 |
| 2,590,422 | Large | Mar. 25, 1952 |
| 2,648,369 | Todd | Aug. 11, 1953 |

FOREIGN PATENTS

| | | |
|---|---|---|
| 457,412 | Great Britain | Nov. 27, 1936 |
| 20,395 | Finland | May 30, 1945 |